Sept. 4, 1956     F. P. TAGLIAFERRI ET AL     2,761,950
AUTOMATIC DUAL TEMPERATURE HEATING SYSTEM
Filed July 2, 1952
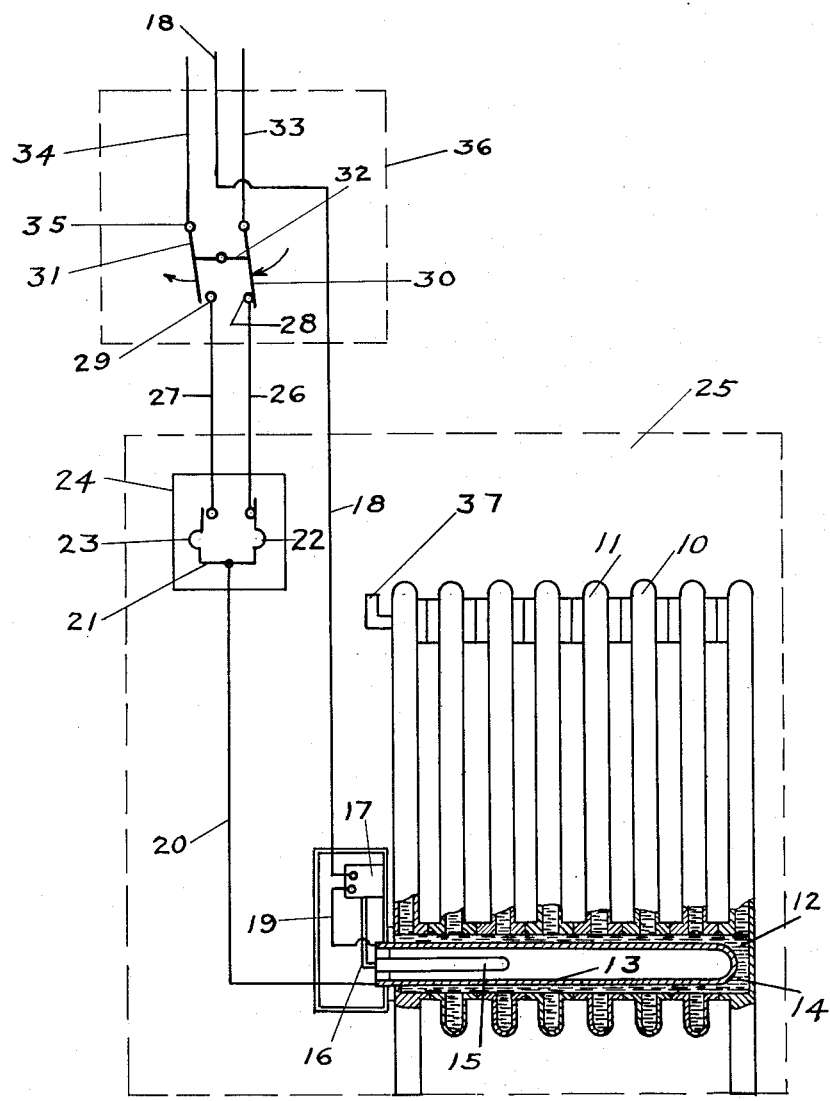
Inventor
FRANK P. TAGLIAFERRI.
FRANCIS T. GIER.
By Howard J. Whelan.
Attorney United States Patent Office 2,761,950
Patented Sept. 4, 1956

2,761,950

AUTOMATIC DUAL TEMPERATURE HEATING SYSTEM

Frank P. Tagliaferri and Francis T. Gier, Baltimore, Md., assignors of one-third to Stanley Hoffman, Baltimore, Md.

Application July 2, 1952, Serial No. 296,852

2 Claims. (Cl. 219—38)

This invention relates to heat exchange systems comprising one or more heat exchange or heat emitting elements supplied by a heating medium thermostatically controlled.

In the conventional system used for heating motels or tourist cabins, the cabins are usually cold until they are rented, then the heat is turned on and considerable time is consumed before the motel or cabin is ready for occupancy.

It is an object of this invention to provide a new and improved dual heating system for use in heating motels and tourist cabins wherein the cabins are continuously heated to a temperature of approximately 55 degrees F. when unoccupied, then automatically raised in temperature to 72 degrees F. when activated from the orifice at prescribed intervals.

It is an object of this invention to provide an electrical heating system for use in motels and tourist cabins having a dual temperature control in each cabin and the master control located in the renting or control office for controlling the heating units in the various cabins and motels.

It is an object of this invention to provide a new and improved heating system for use in motels, and tourist cabins to automatically maintain a low temperature when unoccupied and raise and maintain the higher temperature when rented.

It is an additional object of this invention to provide a new and improved dual contact temperature control device for use in a centrally controlled heating system for use in motels and tourist cabins.

Other objects will become apparent as the invention is more fully set forth.

For a clearer understanding of the invention and the objects thereof, reference is made to the accompanying drawings, wherein a particular form of the invention is indicated. These drawings when used in conjunction with the following description serve to illustrate the invention, its principles and the operation thereof, while the claims indicate the scope thereof.

In the drawing the figure is a diagrammatic view showing an electrically heated and thermostatically controlled radiator unit and master controls embodying this invention, with parts broken away to show its inner construction.

Similar reference characters refer to similar parts throughout the drawings.

In the construction shown in the drawings a radiator 10 is made up of hollow sections 11 to form a heating unit having a cavity 12 in its lower end to receive a heating unit 13 to heat the fluid 14 (preferably #710 heating oil also known as oil bath oil) encased in the radiator and referred to as the heat exchange medium. A bulb 15 positioned in the heating unit 13 is connected by a tube 16 to a thermostatically controlled switch 17 to open and close the connections to the feeder 18 from an outside electrical source to the line 19 connected to one side of the heating unit 13, then through the heater to the feeder 20 and thermostat switch 21. The switch 21 is provided with dual temperature controls comprising a lower temperature contact 22 and a higher temperature contact 23 and preferably mounted in a housing 24 located in the room, motel or tourist cabin 25 to control the temperature therein. Feeders 26 and 27 connect the lower and higher contacts 22 and 23, and lugs 28 and 29 respectively. Master switch 35 comprises arms 30 and 31 preferably joined together by a bar 32 so they will operate together from side to side to connect or disconnect outside feeders 33 and 34. The switch 35 is preferably remotely located in the general or renting office 36.

In the operation of the device the switch 35 located in the office 36, is pushed to the left as shown by the arrows in the drawing, and closes the feeders 33 and 26 to the lower temperature contact 22 which is normally closed until the temperature in the cabin 25 reaches 55° F. and opens the circuit. While the contact 22 is closed, the electrical energy passes along feeder 20 through the heater unit 13 along line 19 and feeder 18 to complete the circuit and keep the temperature in the cabin at its lower setting, preferably 55° F. When the cabin is rented, the switch 35 is moved to the right, opening switch arm 30 and closing switch arm 31 to connect the feeders 34 and 27 through the higher temperature contact 23, feeder 20 to the heater 13 along line 19 and through the thermostatically operated switch 17 which is normally closed when the temperature in the cabin reaches the higher temperature, preferably 72° F. the contact 23 opens and contact 22 closes automatically. The opening and closing of the switch 17 is controlled by bulb 15 located in the radiator 10, and is a safety to prevent overheating the fluid. A relief valve 37 is positioned in the radiator 10.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. In combination with a radiator, a heating unit within said radiator, an electrical circuit for said heating unit, said circuit including a thermostatic switch for maintaining the heating unit to a predetermined low value, a second electrical circuit connected to said heating unit, said second circuit including a thermostatic switch for maintaining the heating unit to a predetermined high value, a source of electrical power, and a manual switch for selectively connecting said source to the circuit of low heat value and to the circuit of high heat value.

2. The combination set forth in claim 1 including thermostatic means located within the radiator for controlling the heating thereof by the temperature of the radiator.

References Cited in the file of this patent

UNITED STATES PATENTS

| 1,167,613 | Apfel | Jan. 11, 1916 |
| 1,369,702 | Oca-Balda | Feb. 22, 1921 |